June 26, 1951     C. CLOS     2,558,540

ELECTROMAGNETIC MOTOR

Filed March 23, 1948

INVENTOR
C. CLOS
BY
J. W. Schmied
ATTORNEY

Patented June 26, 1951

2,558,540

UNITED STATES PATENT OFFICE 2,558,540

ELECTROMAGNETIC MOTOR

Charles Clos, Middle Village, N. Y., assignor to Bell Telephone Laboratories, Incorporated, New York, N. Y., a corporation of New York Application March 23, 1948, Serial No. 16,550

6 Claims. (Cl. 172—36)

This invention pertains to electric motors and more particularly to improvements in commutators for electromagnetic motors.

An object of the invention is to provide a novel means for making and breaking an electrical circuit, whereby current is allowed to pass to appropriate induction coils at predetermined times for the purpose of creating a continuous driving force upon a rotor. This and other objects of the invention will be apparent from the following description, the appended claims, and the drawings, in which:

Figure 1:
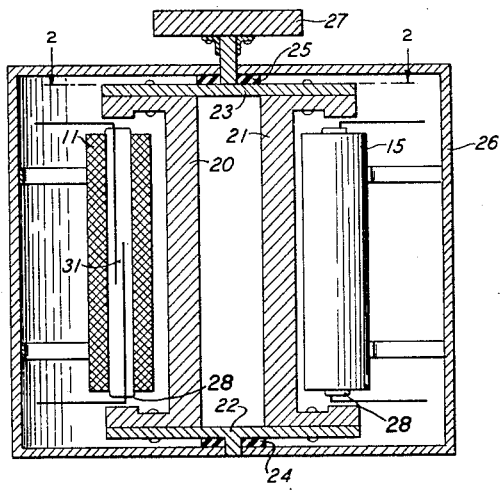
Fig. 1 is a vertical cross-section through the motor.
Figure 4:
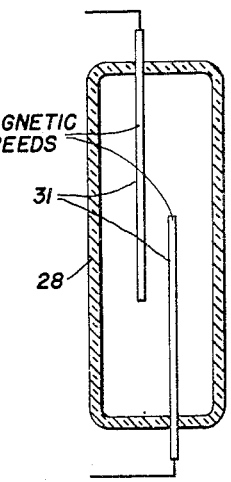

Fig. 4 is an enlarged sectional view of the envelope 28 enclosing the magnetic contact members 31, removed from the operating coil 11 of Fig. 1.

Figure 2:
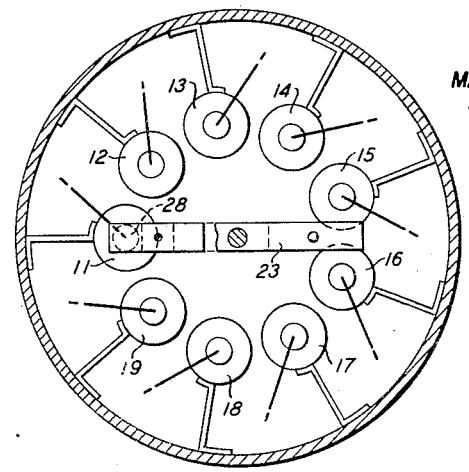
Fig. 2 is a top view of the motor along section line 2—2 in Fig. 1.

As disclosed in Figs. 1 and 2, the rotor of the motor comprises two permanent magnets 20 and 21 supported by end plates 22 and 23 which are in turn supported by washers 24 and 25 and frame 26. End plates 22 and 23 are free to revolve about a vertical axis, the connection between the plates and frame 26 serving as a bearing. Pulley 27 is attached to the shaft of end plate 23 and serves as a means for applying the motion generated by the rotor to other equipment.

The rotor is driven by the attractive force generated by magnet coils 11 through 19. Each magnet coil is attached to frame 26 and circumscribes an encasement which contains a nonoxidizing gas and a reed switch. With reference to coil 11, encasement 28 may be made of glass or other suitable container, and reed switch 31 comprises two reeds or wires made of magnetic material such as Permalloy. These reeds are adjusted so as to close when they are directly within the magnetic field of one of the rotor magnets. For a small motor, magnet coils 11 through 19 and the associated reed switches 31 through 39 may comprise nine reed relays of conventional design. Although nine magnet coils and two permanent magnets have been indicated for the purpose of this disclosure, it will be apparent that different combinations may be used. Two or more permanent magnets can be used in the rotor if the motor is to operate on direct current or two or any multiple of two permanent magnets can be used if the motor is to operate on alternating current. If more than two permanent magnets are used, an odd number of magnet coils is not necessarily required.

Figure 3:
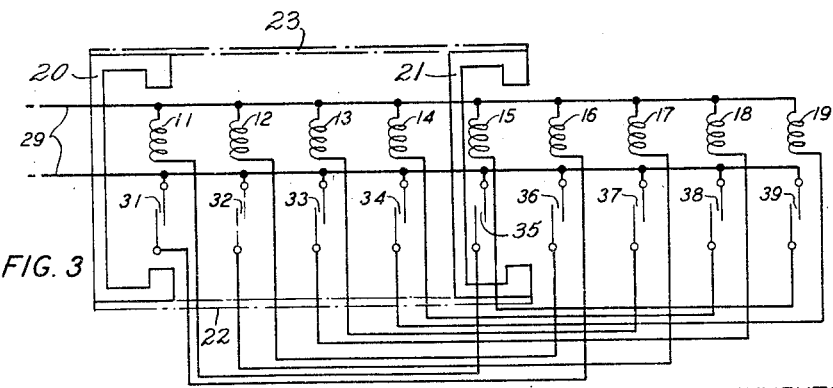
Fig. 3 is a diagrammatical illustration of the motor.

For the disclosure of the operation of the motor which follows, reference will be made to the top view of the apparatus disclosed in Fig. 2 and to the diagrammatic illustration in Fig. 3. The operation of the apparatus on direct current will be discussed first, and for such operation magnets 20 and 21 are oriented so that the poles of the same magnetic polarity are adjacent.

The magnet coils are connected to line 29 in such manner that the magnetomotive force developed by each coil is of the same polarity. The current impressed across line 29 must be of a polarity that will cause each magnet coil, when energized, to develop a magnetomotive force which is of opposite polarity to that applied to the coil by magnets 20 and 21. When the rotor is in the position indicated by Figs. 2 and 3, the magnetomotive force applied by magnet 20 holds reeds 31 closed, and the other reeds remain open since none of them are directly within the magnetic field of a rotor magnet. The closure of reeds 31 serves to connect coil 16 across line 29, and when coil 16 is energized the magnetomotive force which it develops serves to attract magnet 21 of the rotor. This will cause the rotor to move in a clockwise direction. When magnet 20 moves away from reeds 31 a sufficient distance so that the reeds are not directly within the magnetic field of the magnet, the reeds will open and coil 16 will be deactivated. However, as soon as magnet 20 rotates far enough to release reeds 31, magnet 21 is in a position to cause reeds 36 to close. The closure of reeds 36 causes the current from the line to energize coil 12; coil 12 attracts magnet 20, and so on.

When line 29 is deenergized the rotor will always stop so that the pole faces of one of the magnets are directly above and below one of the reed switches since the reeds will furnish a low magnetic reluctance path for the magnetic field of the magnet. This low magnetic reluctance path serves to hold the rotor in a fixed position until the line is again energized. Since one of the reed switches is always closed while the line is deenergized, it follows that the motor is self-starting and in condition at any time to receive current from the line.

The above-described apparatus may be modified to operate on alternating current by orienting magnets 20 and 21 so that poles of opposite polarity are adjacent. When the rotor is in the position indicated by Figs. 2 and 3 and an alternating current is impressed across line 29, the magnetomotive force applied by magnet 20 holds reeds 31 closed, and the other reeds remain open since none of them are directly within the magnetic field of a rotor magnet. The closure of reeds 31 serves to connect coil 16 across line 29, and when coil 16 is energized by a half-cycle of the alternating current which develops a magnetic field across coil 16 which is of opposite polarity to the magnetic field applied to the coil by magnet 21, the rotor moves in a clockwise direction. As before, reeds 31 open, coil 16 is deactivated, reeds 36 close and coil 12 is connected to line 29. The next half-cycle of alternating current develops a magnetic field across coil 12 which serves to attract magnet 20, and so on.

The apparatus disclosed in this invention may be used to follow pulses such as the signaling pulses employed in telephone systems. For this type of operation the magnetic poles should be oriented as described for direct current operation. If direct current pulses of proper time duration are impressed across line 29, the rotor is caused to move one step for each pulse. If a pulse of current is applied to the line when the rotor is in the position indicated in Figs. 2 and 3, magnet 21 will be attracted by coil 16. The magnet will move towards coil 16, and if the momentum is of proper magnitude magnet 21 will stop so that its pole faces are directly above and below coil 16 since reeds 36 will furnish a low magnetic reluctance path for the magnetic field of magnet 21. On the second pulse the rotor moves so that magnet 20 is at coil 12, and so on.

For use as a pulse follower in a switching system, pulley 27 may be replaced by the rotor of a conventional type rotary switch. Instead of operating a rotary switch, additional magnetic reeds might be associated with each inductance coil. In the latter case the additional reeds may be isolated from the electrical circuit of the pulsing system and employed to perform switching functions in conjunction with external equipment.

It is to be observed that the size and magnetic strength of the magnets, the characteristics of the reed switches, and the speed at which the rotor is moved determine the distance which the reeds should be spaced one from another. The speed at which the rotor moves is governed by the magnetomotive force developed by the coils, the characteristics of the reed switches, the magnetic strength of the magnets, and the mass of the rotor.

Although a specific embodiment of this invention has been shown and described, it will be understood that modifications may be made therein without departing from the scope and spirit thereof as defined by the appended claims.

What is claimed is:

1. In an electromagnetic motor, a plurality of induction coils, a set of contacts placed within each induction coil and adapted to close when a magnetic field of predetermined intensity is applied thereto, a rotor comprising a plurality of permanent magnets, said magnets being positioned so as to revolve about an axis which is parallel to the axes of said induction coils in such manner that the upper pole faces of said magnets pass over one end of the induction coils and said set of contacts and so that the lower pole faces of said magnets pass over the other end of the induction coils and said set of contacts, and interconnecting means between each induction coil and a source of electric current, said interconnecting means including a suitable set of said contacts so that current is allowed to pass to the appropriate induction coil at a predetermined time so as to create a constant driving force upon said rotor.

2. An electromagnetic device comprising a plurality of magnet coils, a plurality of normally open contact members enclosed within each coil, said contact members responsive to external sources of magnetic lines of force to close their respective contacts, a rotor comprising a plurality of magnets rotatable with respect to said coils into magnetic proximity to each of said coils and contact members successively, a source of electrical energy, and interconnecting means between each coil and said source of electrical energy, said interconnecting means including a pair of said magnetic contacts.

3. In an electric motor, a plurality of magnet coils, a pair of magnetic reed contact members enclosed within each coil, each pair of magnetic reed members normally separated from each other but adapted to be joined in conductive contact when subjected to a magnetic field of predetermined intensity, a rotor comprising a plurality of magnets attractable into magnetic proximity to each of said coils and contact members successively whereby contact members within the field of said magnets are closed, a source of electrical energy, interconnecting means between each coil and said source of electrical energy, said interconnecting means including a selected pair of said contact members whereby electrical energy is conducted to an appropriate coil to exert a driving force upon said rotor.

4. A switching device comprising a plurality of induction coils, a plurality of pairs of magnetic contact members enclosed within each of said coils, said pairs of members normally in open condition but adapted to close contact with each other under the influence of an external magnetic field, a rotor comprising a plurality of magnets rotatable into proximity to each of said coils and contact members successively in a manner to operate said members to close contact, a source of pulses of electrical energy, interconnecting means between each of said induction coils and said source of electrical energy, said interconnecting means each including a selected pair of said contact members such that said pulses of electrical energy are successively applied to different coils to move said rotor through a number of arcs corresponding to the number of pulses applied, and said unselected pairs of contacts are successively closed one at a time.

5. In an electric pulse follower a plurality of induction coils, a pair of normally open magnetic contacts enclosed within each coil and adapted to close contact when a magnetic field of sufficient intensity is applied thereto, a rotor comprising a plurality of magnets rotatable about an axis parallel to the axes of said coils in such manner that opposite pole faces of said magnet pass over opposite ends of said coils one at a time to successively apply a magnetic field to each of said pairs of contacts, a source of pulses of electrical current, and interconnecting means including a selected pair of said contacts between each of said coils and said source of electrical current so as to conduct said current to an appropriate induction coil at a predetermined time to cause said rotor to advance step by step with each pulse of applied electrical current.

6. An electromagnetic device comprising a plurality of coils fixed in a circle, a pair of normally open contact members of magnetic material enclosed within each of said coils, a rotor comprising a plurality of magnets fixed thereto, each of said pairs of contact members being subjected in succession to the field of each of said magnets when rotated, a source of electrical energy common to said coils, and means individually connecting each of said coils in series with said source and one of said pairs of contact members, whereby actuation of any pair of contact members when subjected to the field of one of said magnets causes the energization of a coil which is in proximity to another of said magnets thereby to effect movement of the rotor.

CHARLES CLOS.

REFERENCES CITED

The following references are of record in the file of this patent:

UNITED STATES PATENTS

| Number | Name | Date |
| --- | --- | --- |
| 2,266,037 | Henninger et al. | Dec. 16, 1941 |
| 2,455,494 | Jaynes | Dec. 7, 1948 |